(12) United States Patent
Shin et al.

(10) Patent No.: US 11,738,738 B2
(45) Date of Patent: Aug. 29, 2023

(54) SYSTEM AND METHOD FOR CONTROLLING SHIFT OF HYBRID VEHICLE

(71) Applicants: Hyundai Motor Company, Seoul (KR); Kia Corporation, Seoul (KR)

(72) Inventors: Yong Uk Shin, Seongnam-si (KR); Byeong Wook Jeon, Seoul (KR); Dong Hoon Jeong, Hwaseong-Si (KR); Min Jae Chai, Gwangmyeong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 276 days.

(21) Appl. No.: 17/371,446

(22) Filed: Jul. 9, 2021

(65) Prior Publication Data

US 2022/0281436 A1 Sep. 8, 2022

(30) Foreign Application Priority Data

Mar. 8, 2021 (KR) .......................... 10-2021-0030007

(51) Int. Cl.
| | |
|---|---|
| *B60W 10/11* | (2012.01) |
| *B60W 20/30* | (2016.01) |
| *B60W 20/14* | (2016.01) |
| *B60L 58/13* | (2019.01) |
| *B60W 10/10* | (2012.01) |
| *B60W 10/26* | (2006.01) |
| *B60W 10/06* | (2006.01) |

(52) U.S. Cl.
CPC ............. *B60W 20/30* (2013.01); *B60L 58/13* (2019.02); *B60W 10/06* (2013.01); *B60W 10/10* (2013.01); *B60W 10/11* (2013.01); *B60W 10/26* (2013.01); *B60W 20/14* (2016.01); *B60W 2510/083* (2013.01); *B60W 2510/244* (2013.01); *B60W 2520/10* (2013.01); *B60W 2540/10* (2013.01); *B60W 2710/10* (2013.01)

(58) Field of Classification Search
CPC ...... B60W 10/10; B60W 10/11; B60W 10/06; B60W 10/08; B60W 30/18127; B60W 2520/10; B60W 2510/244; B60W 2555/60
See application file for complete search history.

(56) References Cited

U.S. PATENT DOCUMENTS

| | | | |
|---|---|---|---|
| 6,617,703 B2 * | 9/2003 | Matsubara | ............... B60K 6/50 290/400 |
| 9,481,371 B2 * | 11/2016 | Park | ................ B60W 30/18127 |
| 11,498,568 B2 * | 11/2022 | Huh | ....................... B60W 40/04 |
| 2020/0182350 A1 * | 6/2020 | Park | .................... F16H 61/0213 |

\* cited by examiner

*Primary Examiner* — Erin D Bishop (74) *Attorney, Agent, or Firm* — Morgan, Lewis & Bockius LLP (57) ABSTRACT

A system and a method for controlling shifting stage of a hybrid vehicle may include a speed detecting device that detects a vehicle speed, an automatic transmission that changes a shifting stage of the vehicle, and a shift controller connected to the speed detecting device and the automatic transmission. The shift controller is configured to determine a start of shift control based on a travel environment and a travel state of the vehicle, compares the vehicle speed with a target vehicle speed when the start of the shift control is determined, and performs the shift control based on a state of charge of a battery of the vehicle and a regenerative braking amount of the vehicle when the shift controller concludes that the vehicle speed exceeds the target vehicle speed.

17 Claims, 5 Drawing Sheets

SYSTEM AND METHOD FOR CONTROLLING SHIFT OF HYBRID VEHICLE

CROSS-REFERENCE TO RELATED APPLICATION

The present application claims priority to Korean Patent Application No. 10-2021-0030007, filed on Mar. 8, 2021, the entire contents of which is incorporated herein for all purposes by this reference.

BACKGROUND OF THE INVENTION

Field of the Invention

The present invention relates to a system and a method for controlling shifting stage of a hybrid vehicle.

Description of Related Art

In general, an automatic transmission allows an optimal shifting stage to be automatically implemented based on a vehicle travel situation such as an accelerator pedal position, a vehicle speed, and the like. When a vehicle coasts before reaching a target point, an existing automatic transmission predicts a deceleration profile for each shifting stage to allow the vehicle to travel with a shifting stage which is most advantageous for fuel economy while satisfying a target vehicle speed when passing the target point.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and a method for controlling shifting stage of a hybrid vehicle that complexly control a shifting stage, a regenerative braking amount, and an engine brake such that a vehicle speed may reach a target vehicle speed.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a system for controlling shifting stage of a hybrid vehicle includes a speed detecting device that detects a vehicle speed, an automatic transmission that changes a shifting stage of the vehicle, and a shift controller electrically connected to the speed detecting device and the automatic transmission, and the shift controller is configured to determine a start of shift control based on a travel environment and a travel state of the vehicle, compares the vehicle speed with a target vehicle speed when the start of the shift control is determined, and performs the shift control based on a state of charge of a battery of the vehicle and a regenerative braking amount of the vehicle when the shift controller concludes that the vehicle speed exceeds the target vehicle speed.

In various exemplary embodiments of the present invention, the shift controller may recognize an overspeed monitoring location in front of the vehicle based on a vehicle location or the overspeed monitoring location received from a navigation device, set the overspeed monitoring location in front of the vehicle as a target location, determine whether the vehicle is coasting according to a position of an accelerator pedal measured by an accelerator position sensor, and determine to start target location-based shift control when the vehicle is coasting toward the target location.

In various exemplary embodiments of the present invention, the shift controller may compare the state of charge of the battery with a reference state of charge of the battery, compare the regenerative braking amount with a maximum regenerative braking amount when the state of charge of the battery is less than the reference SOC value of the battery, and change a current stage of the shifting stage to a lower stage when the shift controller concludes that the regenerative braking amount is equal to or greater than the maximum regenerative braking amount.

In various exemplary embodiments of the present invention, the maximum regenerative braking amount may be set based on a motor capacity and a battery capacity.

In various exemplary embodiments of the present invention, the shift controller may be configured to determine a motor regenerative torque according to the changed shifting stage after the shifting stage is changed.

In various exemplary embodiments of the present invention, the shift controller may compare the state of charge of the battery with a reference state of charge of the battery, compare the regenerative braking amount with a maximum regenerative braking amount when the state of charge of the battery is less than the reference SOC value of the battery, and increase a motor regeneration amount by a specific regeneration amount when the regenerative braking amount is less than the maximum regenerative braking amount.

In various exemplary embodiments of the present invention, the specific regeneration amount may be tuned based on a distance between the vehicle location and the target location and the vehicle speed.

In various exemplary embodiments of the present invention, the shift controller may perform the shift control using an engine brake when the state of charge of the battery is equal to or greater than the reference SOC value of the battery.

According to various aspects of the present invention, a method for controlling shifting stage of a hybrid vehicle includes determining a start of shift control based on a travel environment and a travel state of the vehicle, comparing a vehicle speed with a target vehicle speed when the start of the shift control is determined, and performing the shift control based on a state of charge of a battery of the vehicle and a regenerative braking amount of the vehicle when the shift controller concludes that the vehicle speed exceeds the target vehicle speed.

In various exemplary embodiments of the present invention, the determining to start the shift control may include recognizing an overspeed monitoring location in front of the vehicle based on a vehicle location or the overspeed monitoring location received from a navigation device, and setting the overspeed monitoring location in front of the vehicle as a target location, determining whether the vehicle is coasting according to a position of an accelerator pedal measured by an accelerator position sensor, and determining to start target location-based shift control when the vehicle is coasting toward the target location.

In various exemplary embodiments of the present invention, the performing of the shift control may include comparing the state of charge of the battery with a reference state of charge of the battery, comparing the regenerative braking amount with a maximum regenerative braking amount when the state of charge of the battery is less than the reference SOC value of the battery, and changing a current stage of the shifting stage to a lower stage when the shift controller concludes that the regenerative braking amount is equal to or greater than the maximum regenerative braking amount.

In various exemplary embodiments of the present invention, the maximum regenerative braking amount may be set based on a motor capacity and a battery capacity.

In various exemplary embodiments of the present invention, the performing of the shift control may further include determining a motor regenerative torque according to the changed shifting stage after the shifting stage is changed.

In various exemplary embodiments of the present invention, the performing of the shift control may further include comparing the state of charge of the battery with a reference state of charge of the battery, comparing the regenerative braking amount with a maximum regenerative braking amount when the state of charge of the battery is less than the reference SOC value of the battery, and increasing a motor regeneration amount by a specific regeneration amount when the regenerative braking amount is less than the maximum regenerative braking amount.

In various exemplary embodiments of the present invention, the specific regeneration amount may be tuned based on a distance between the vehicle location and the target location and the vehicle speed.

In various exemplary embodiments of the present invention, the performing of the shift control may further include performing the shift control using an engine brake when the state of charge of the battery is equal to or greater than the reference SOC value of the battery.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of the related known configuration or function will be omitted when it is determined that it interferes with the understanding of the exemplary embodiment of the present invention.

In describing the components of the exemplary embodiment according to various exemplary embodiments of the present invention, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Figure 1:
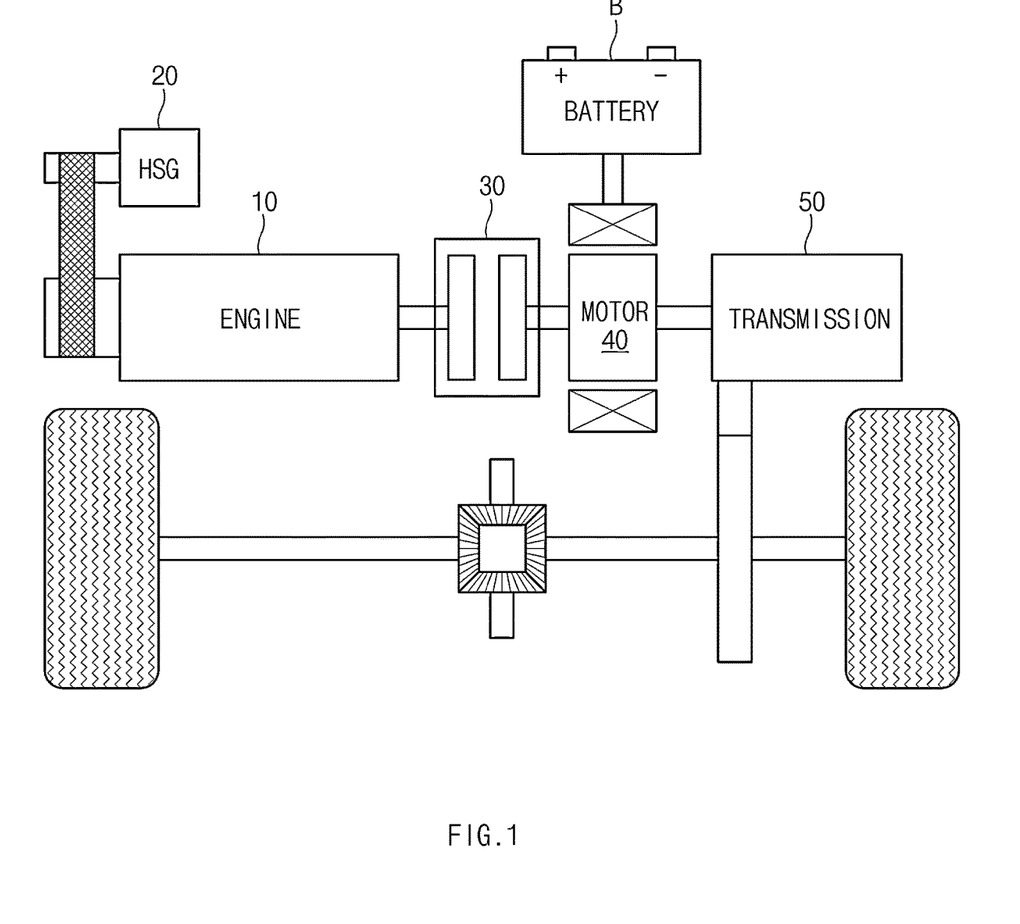
FIG. 1 is a block diagram illustrating a hybrid vehicle related to the present invention.

FIG. 1 is a block diagram illustrating a hybrid vehicle related to the present invention.

A hybrid vehicle is a vehicle that utilizes two or more different driving sources, and generally refers to a vehicle driven by an engine that generates a driving force by burning fuel and a motor that generates the driving force with electrical energy of a battery. For example, there are a hybrid electric vehicle (HEV) and a plug-in hybrid electric vehicle (PHEV). Referring to FIG. 1, the hybrid vehicle may include an engine 10, a hybrid starter generator (HSG) 20, a clutch 30, a motor 40, a transmission 50, and the like.

The engine 10 may generate power (an engine torque) required to drive the vehicle by burning the fuel. As the engine 10, various known engines such as a gasoline engine, a diesel engine, or the like may be used. The engine 10 may control an output torque (that is, an engine torque) in response to a command of an engine management system (EMS).

The HSG 20 may be mounted on the engine 10 to start the engine 10 by cranking the engine 10. The HSG 20 may play a key role of starting the engine when switching from an electric vehicle mode to a hybrid mode in which the engine 10 and the motor 40 operate together. The HSG 20 may generate the electrical energy by operating as a generator in a state in which the engine 10 is started. The electrical energy generated by the HSG 20 may be used to charge a battery "B".

The clutch 30 may be disposed between the engine 10 and the motor 40 to regulate the power (the output torque) of the engine 10. The clutch 30 may transmit, to a driving wheel (a wheel), or block the power (the engine torque) generated by the engine 10 through engagement or disengagement.

The motor 40 may receive electric power from the battery "B" to generate the power (motor power) and transmit the power to the driving wheel. The motor 40 may control the output torque (a motor torque) of the motor 40 by changing a rotation direction and revolutions per minute (RPM) in response to instruction of a motor control unit (MCU). The motor 40 may be used as a generator for charging the battery "B" by generating a counter electro-motive force when a state of charge (SOC) of the battery is insufficient or during regenerative braking. The battery "B" is configured to supply electric power required for driving the vehicle, which may be implemented as a high voltage battery. A power converter may be disposed between the motor 40 and the battery "B". The power converter may convert a voltage output from the battery "B" into a motor driving voltage and supply the motor driving voltage. The battery "B" may be charged by regenerative energy generated from the motor 40.

The transmission 50 may output the motor torque or a value obtained by converting the engine torque and the motor torque in a shift ratio matching a shifting stage (a gear stage). The transmission 50 may change the shifting stage in response to instruction of a transmission control unit (TCU). The TCU may determine the optimal shifting stage based on information such as a travel speed of the vehicle (that is, a vehicle speed or a wheel speed), a position of an acceleration pedal, an engine revolution per minute, and/or clutch travel through sensors in the vehicle.

Figure 2:
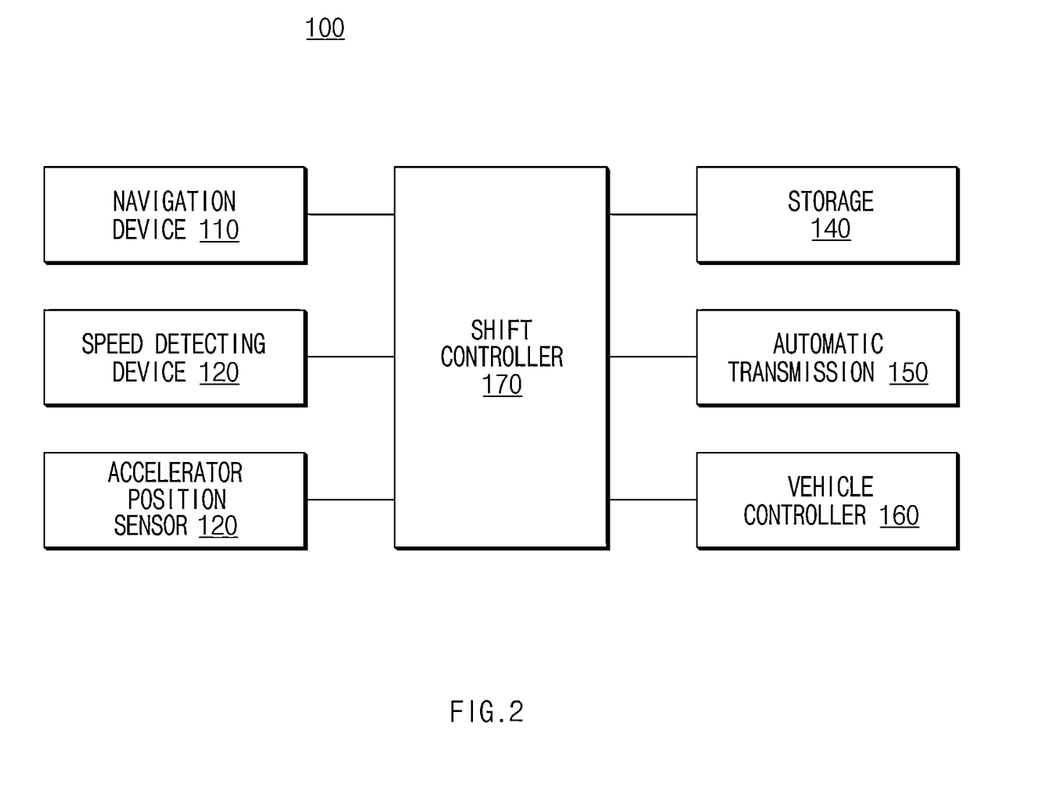
FIG. 2 is a block diagram illustrating a system for controlling shifting stage of a hybrid vehicle according to exemplary embodiments of the present invention.

FIG. 2 is a block diagram illustrating a system for controlling shifting stage of a hybrid vehicle according to exemplary embodiments of the present invention.

Referring to FIG. 2, a system 100 for controlling shifting stage of the hybrid vehicle may include a navigation device 110 connected through a vehicle network and/or a wireless network, a speed detecting device 120, an accelerator position sensor (APS) 130, storage 140, an automatic transmission 150, a vehicle controller 160, a shift controller (TCU) 170, and the like. The vehicle network may be implemented as a controller area network (CAN), a media oriented systems transport (MOST) network, a local interconnect network (LIN), an ethernet, and/or a X-by-Wire (Flexray). As the wireless network, a Wi-Fi, a Bluetooth, a near field communication (NFC), a radio frequency identification (RFID), an infrared data association (IrDA), and/or a ZigBee may be used.

When a destination is set, the navigation device 110 may navigate and guide a travel route to the destination. The navigation device 110 may search for an optimal route (e.g., a shortest distance and/or a minimum time) by reflecting real-time traffic information when searching for the travel route. Although not shown in the drawing, the navigation device 110 may include a memory for storing map data, a global positioning system (GPS) receiver for measuring a vehicle location, a communication module for receiving the traffic information from outside, and/or a processor for searching for the travel route and guiding a route along the searched travel route.

The navigation device 110 may transmit information such as the travel route, road information (e.g., a speed limit and the like), the vehicle location, and/or an overspeed monitoring location to the shift controller 170. In the present connection, the overspeed monitoring location may be a location of an overspeed monitoring camera installed to regulate an overspeeding vehicle.

The speed detecting device 120 may detect a current vehicle speed (the vehicle speed). The speed detecting device 120 may measure the vehicle speed using a wheel speed sensor, a vehicle speed sensor, or the like. Furthermore, the speed detecting device 120 may receive vehicle speed information from the navigation device 110, the vehicle controller 160, a cluster, or the like.

The accelerator position sensor 130 may measure the position of the accelerator pedal. The accelerator position sensor 130 may convert an amount of stepping on the accelerator pedal into a voltage and output the voltage.

The storage 140 may store information (data) received from the navigation device 110, information output from the speed detecting device 120 and the accelerator position sensor 130, and data input and/or output in response to operations of the vehicle controller 160 and the shift controller 170. The storage 140 may store a deceleration profile for each shifting stage. The storage 140 may include at least one of storage media (recording media) of a flash memory, a hard disk, a solid state disk (SSD), a secure digital card (SD card), a random access memory (RAM), a static random access memory (SRAM), a read only memory (ROM), a programmable read only memory (PROM), an electrically erasable and programmable ROM (EEPROM), and/or an erasable and programmable ROM (EPROM).

The automatic transmission 150 may output the motor torque or the value obtained by converting the engine torque and the motor torque in the shift ratio matching the shifting stage. The automatic transmission 150 may automatically change the shifting stage in response to instruction of the shift controller 170.

The vehicle controller 160 may control overall operations of the hybrid vehicle. The vehicle controller 160 may receive a current shifting stage, a motor regeneration amount (regenerative energy), and the like from the shift controller 170. The vehicle controller 160 may monitor the state of charge (SOC) of the battery through communication with a battery management system (BMS). The vehicle controller 160 may transmit the state of charge of the battery and a maximum regeneration amount to the shift controller 170.

The shift controller 170 may collect the information such as the vehicle speed, the position of the accelerator pedal, and the like through the speed detecting device 120 and the accelerator position sensor 130. The shift controller 170 may determine the optimal shifting stage based on the information such as the vehicle speed, the position of the accelera- tion pedal, and the like. The shift controller 170 may instruct the automatic transmission 150 to change to the determined shifting stage. The shift controller 170 may transmit the information on the shifting stage and the motor regeneration amount to the vehicle controller 160. The shift controller 170 may receive the information on the state of charge (SOC) of the battery and the maximum motor regeneration amount (a maximum regenerative braking amount) from the vehicle controller 160.

Each of the vehicle controller 160 and the shift controller 170 may include at least one processor. The processor may be implemented as at least one processing device of an application specific integrated circuit (ASIC), a digital signal processor (DSP), a programmable logic device (PLD), a field programmable gate array (FPGA), a central processing unit (CPU), a microcontroller, and/or a microprocessor. Furthermore, each controller 160 or 170 may include a memory located inside and/or outside the processor. The memory may be a non-transitory storage medium that stores instructions executed by the processor. The memory may be a random access memory (RAM), a static random access memory (SRAM), a read only memory (ROM), a programmable read only memory (PROM), an electrically erasable and programmable ROM (EEPROM), and/or an erasable and programmable ROM (EPROM).

The shift controller 170 may recognize an overspeed monitoring location located in front of the vehicle based on the travel route, the vehicle location, or the overspeed monitoring location received from the navigation device 110. For example, the shift controller 170 may recognize an overspeed monitoring location located within 500 m of the vehicle ahead by comparing the vehicle location and the overspeed monitoring location with each other based on the travel route. Furthermore, the shift controller 170 may recognize the overspeed monitoring location by detecting an overspeed monitoring camera installed in the front using a camera or the like mounted on the vehicle. The shift controller 170 may set the recognized overspeed monitoring location as a target location.

The shift controller 170 may determine whether the vehicle is coasting using the accelerator position sensor 130. The shift controller 170 may determine that the vehicle is coasting when a driver does not step on the acceleration pedal.

The shift controller 170 may determine to start target location-based shift control when the vehicle is coasting toward the target location. The shift controller 170 may predict the deceleration profile for each shifting stage during the coasting, and determine the optimal shifting stage for the vehicle speed to reach the target vehicle speed based on the predicted deceleration profile for each shifting stage when passing the target location. The shift controller 170 may determine not to start the target location-based shift control when the overspeed monitoring location is recognized, but the vehicle is not coasting.

The shift controller 170 may compare the current vehicle speed with the target vehicle speed when it is determined to start the shift control. The shift controller 170 may acquire the current vehicle speed using the speed detecting device 120. The shift controller 170 may set a speed limit set at the overspeed monitoring location (the target location) as the target vehicle speed. That is, the shift controller 170 may set a speed limit set in the overspeed monitoring camera as the target vehicle speed.

When the vehicle speed exceeds the target vehicle speed, the shift controller 170 may compare the state of charge (SOC) of the battery with a reference SOC. The reference SOC may be set during system design. When the SOC is less than the reference SOC, the shift controller 170 may determine whether a current regenerative braking amount is equal to or greater than the maximum regenerative braking amount.

The shift controller 170 may change a current stage of the shifting stage to a lower stage when the shift controller concludes that the regenerative braking amount is equal to or greater than the maximum regenerative braking amount. For example, when a current shifting stage is a stage 4, the shift controller 170 may change the shifting stage from the stage 4 to a stage 3.

The shift controller 170 may determine a motor regenerative torque based on the changed shifting stage after the shifting stage is changed. The shift controller 170 may determine a motor regenerative torque "T" after changing the shifting stage using a following [Mathematical Equation 1]. The determined motor regenerative torque "T" may be used to determine the regenerative braking amount.

$$T = \frac{g_{after}}{g_{before}} \times T_{before} \quad \text{[Mathematical Equation 1]}$$

Here, $g_{after}$ is a gear ratio after the shifting stage change, $g_{before}$ is a gear ratio before the shifting stage change, and $T_{before}$ is a motor regenerative torque before the shifting stage change.

When the regenerative braking amount is less than the maximum regenerative braking amount, the shift controller 170 may increase the motor regeneration amount by +α. Here, α is a tuning element, which may be tuned based on a distance between the vehicle location and the overspeed monitoring location and the vehicle speed.

The shift controller 170 may perform engine brake prediction control when the SOC is equal to or greater than the reference SOC when the current vehicle speed exceeds the target vehicle speed. The shift controller 170 may control the vehicle speed to be equal to or lower than the target vehicle speed using only the shifting stage and an engine brake. The shift controller 170 may subdivide the distance from the current vehicle location to the overspeed monitoring location into a plurality of sections based on the information on the overspeed monitoring location and the vehicle speed. The shift controller 170 may set a target speed of a point (a target location of each section) passing through each subdivided section. The shift controller 170 may perform the shift control by determining a target speed for each section and a target location for each section, and determining a final shifting stage based on the deceleration profile for each section.

Figure 3:
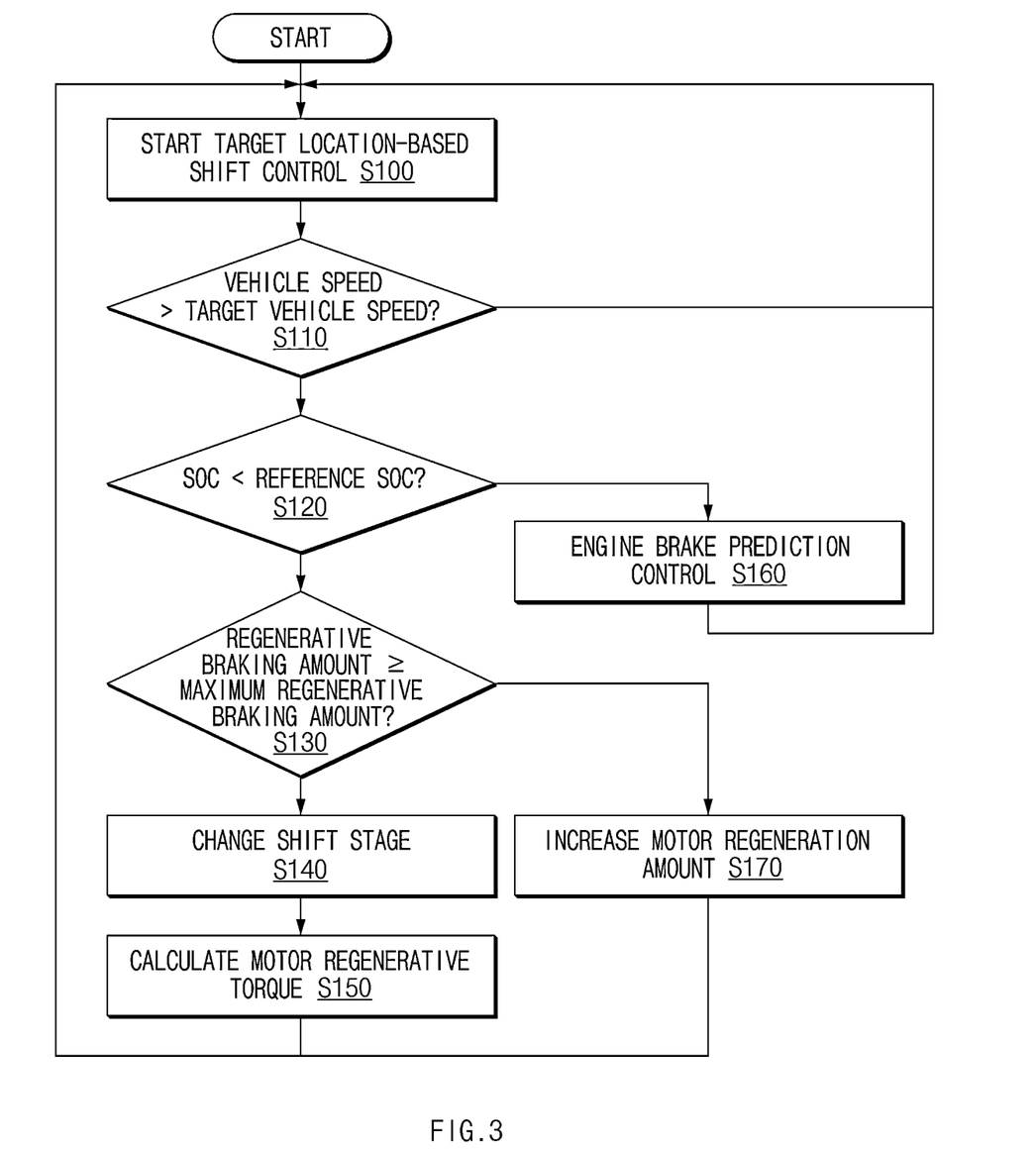
FIG. 3 is a flowchart illustrating a method for controlling shifting stage of a hybrid vehicle according to exemplary embodiments of the present invention.

FIG. 3 is a flowchart illustrating a method for controlling shifting stage of a hybrid vehicle according to exemplary embodiments of the present invention.

The shift controller 170 may determine to start shift control based on a travel environment and a travel state of the vehicle (S100). The shift controller 170 may receive the information such as the travel route, the vehicle location, the overspeed monitoring location, and the like from the navigation device 110, and recognize the overspeed monitoring location in front of the vehicle based on the received information. The shift controller 170 may determine whether the vehicle is coasting (coasting deceleration) using the accelerator position sensor 130. The shift controller 170 may recognize the overspeed monitoring location in front of the vehicle, and start the target location-based shift control when the vehicle is coasting.

The shift controller 170 may compare the vehicle speed and the target vehicle speed with each other (S110). The shift controller 170 may acquire the current vehicle speed using the speed detecting device 120. The shift controller 170 may determine whether the acquired vehicle speed exceeds the target vehicle speed.

When the vehicle speed exceeds the target vehicle speed, the shift controller 170 may determine whether the SOC is less than the reference SOC (S120). The shift controller 170 may receive current SOC information from the vehicle controller 160.

When the SOC is less than the reference SOC, the shift controller 170 may determine whether the regenerative braking amount is equal to or greater than the maximum regenerative braking amount (S130). The shift controller 170 may receive the maximum motor regeneration amount from the vehicle controller 160 and determine the maximum regenerative braking amount.

The shift controller 170 may change the shifting stage to the lower gear stage when the regenerative braking amount is equal to or greater than the maximum regenerative braking amount (S140). The shift controller 170 may share the information on the changed shifting stage with the vehicle controller 160.

The shift controller 170 may determine the motor regenerative torque after changing the shifting stage (S150). The shift controller 170 may determine the motor regenerative torque based on the changed shifting stage. The shift controller 170 may determine the motor regenerative torque using [Mathematical Equation 1] and determine the regenerative braking amount using the determined motor regenerative torque.

When the SOC is equal to or greater than the reference SOC in S120, the shift controller 170 may perform the engine brake prediction control (S160). The shift controller 170 may control deceleration of the vehicle using only the shifting stage and the engine brake.

When the regenerative braking amount is less than the maximum regenerative braking amount in S130, the shift controller 170 may increase the motor regeneration amount by a specific regeneration amount (+α) (S170). The shift controller 170 may tune a based on the distance between the vehicle location and the overspeed monitoring location and the vehicle speed.

Figure 4:
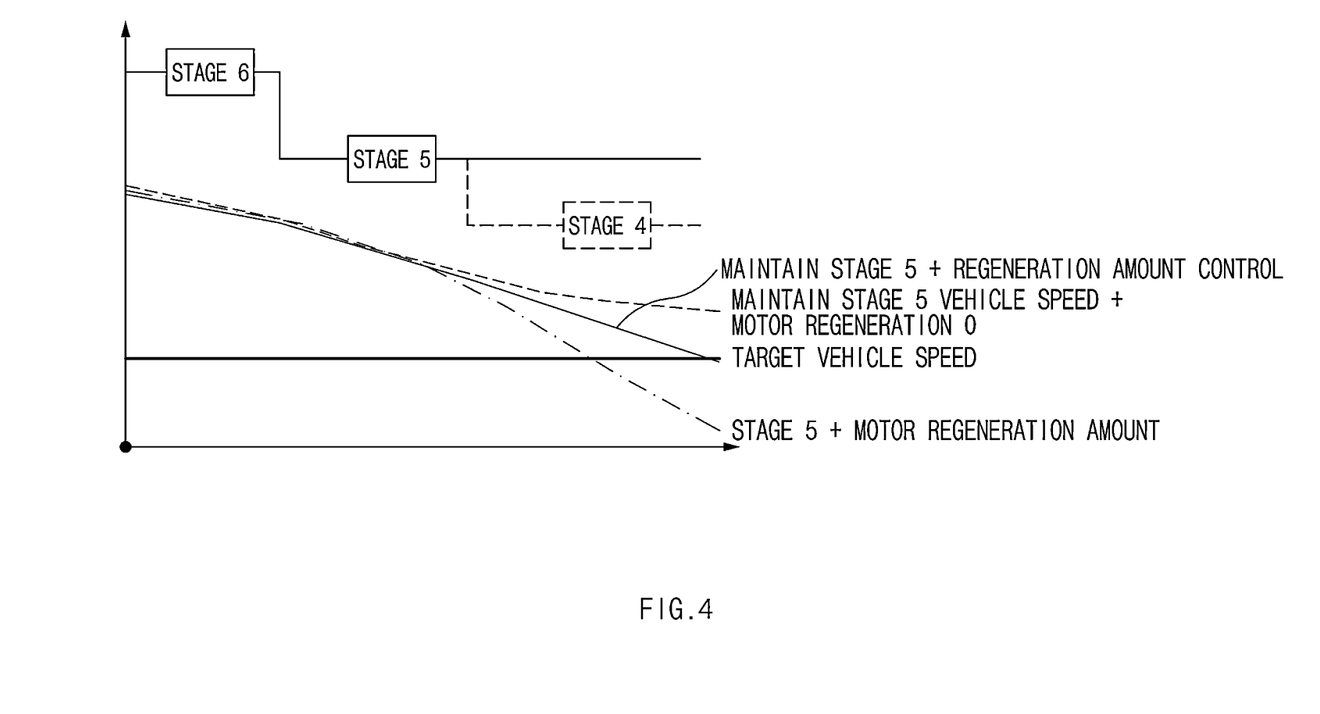
FIG. 4 is a graph illustrating a change in a vehicle speed according to various exemplary embodiments of the present invention.

FIG. 4 is a graph illustrating a change in a vehicle speed according to various exemplary embodiments of the present invention.

Conventionally, when the shifting stage is maintained to control the vehicle speed to be equal to or lower than the target vehicle speed using the shifting stage and the engine brake, for example, when the shifting stage is maintained at a stage 5, the vehicle speed is not able to be matched to the target vehicle speed when passing the target point, so that the shift may be performed once more.

According to various exemplary embodiments of the present invention, because the motor regeneration amount is controlled while maintaining the shifting stage in the stage 5, the vehicle speed may be more precisely matched to the target vehicle speed, and unnecessary shift may be reduced. Furthermore, fuel economy may be improved by use of the regeneration amount as much as possible and reducing the number of shifts to reduce a phenomenon in which regeneration is not be able to be performed during the shift.

Figure 5:
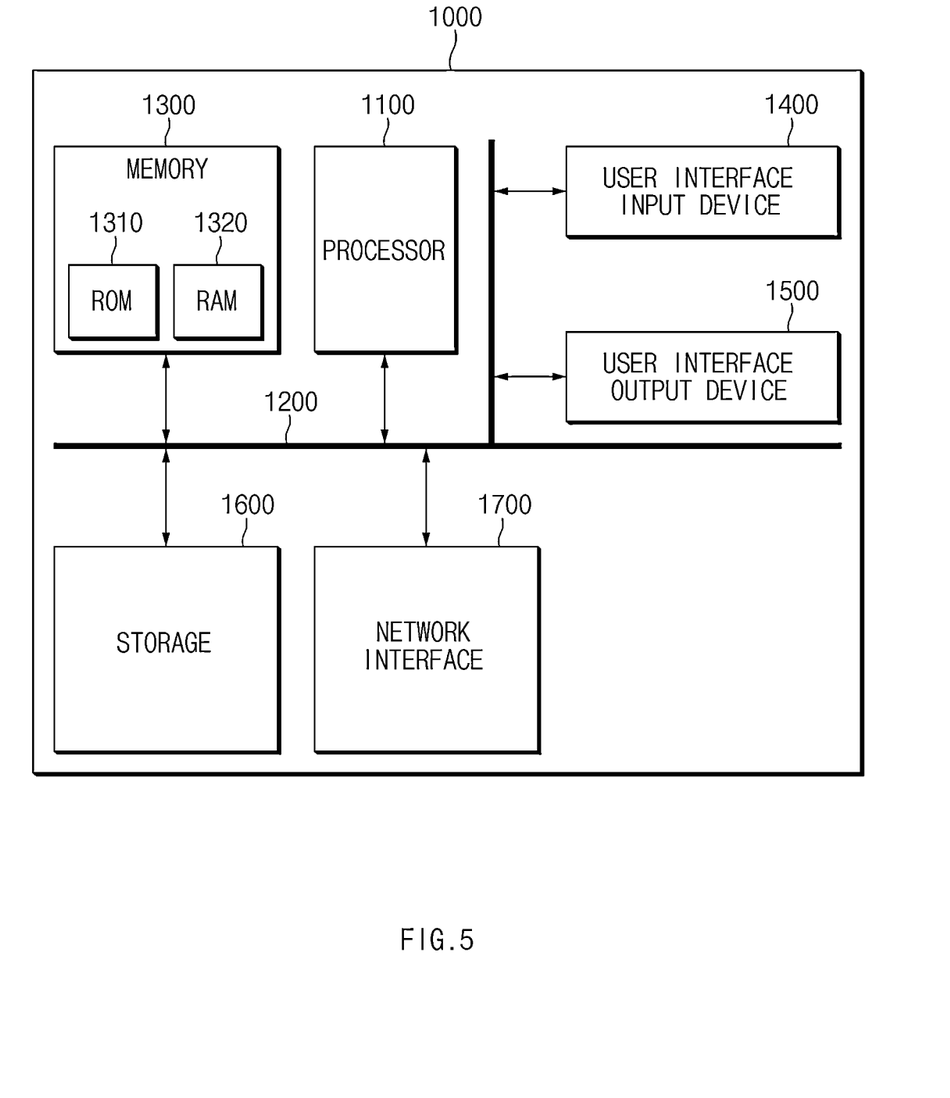
FIG. 5 is a block diagram illustrating a computing system executing a shift control method according to exemplary embodiments of the present invention.

FIG. 5 is a block diagram illustrating a computing system executing a shift control method according to exemplary embodiments of the present invention.

Referring to FIG. 5, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor 1100 and the storage medium may reside as individual components in the user terminal.

The description above is merely illustrative of the technical idea of the present invention, and various modifications and changes may be made by those skilled in the art without departing from the essential characteristics of the present invention. Therefore, the embodiments included in various exemplary embodiments of the present invention are not intended to limit the technical idea of the present invention but to illustrate the present invention, and the scope of the technical idea of the present invention is not limited by the embodiments. The scope of the present invention may be construed as being covered by the scope of the appended claims, and all technical ideas falling within the scope of the claims may be construed as being included in the scope of the present invention.

According to various exemplary embodiments of the present invention, because the optimal shifting stage and the motor regeneration amount are controlled based on the deceleration profile when passing the target point, the vehicle speed may be precisely matched to the target speed when passing the target point. Therefore, a fuel consumption reduction effect may be expected by preventing reacceleration resulted from excessive deceleration. Furthermore, durability of a brake pad and a transmission may be improved by preventing excessive shift and/or unnecessary shift and reducing a brake operation for matching the target vehicle speed.

Furthermore, according to various exemplary embodiments of the present invention, the fuel economy may be improved as travel energy is configured to be minimized by regenerating energy unnecessary for the travel with motor regenerative braking based on the travel situation even without stepping on the brake.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for controlling shifting stage of a vehicle, the system comprising:
   a speed detecting device configured to detect a vehicle speed of the vehicle;
   an automatic transmission configured to change the shifting stage of the vehicle; and
   a shift controller electrically connected to the speed detecting device and the automatic transmission,
   wherein the shift controller is configured to:
      determine a start of shift control of the vehicle according to a travel environment and a travel state of the vehicle;
      compare the vehicle speed with a target vehicle speed when the start of the shift control is determined; and
      perform the shift control according to a state of charge (SOC) value of a battery of the vehicle and a regenerative braking amount of the vehicle when the shift controller concludes that the vehicle speed exceeds the target vehicle speed.

2. The system of claim 1, wherein the shift controller is configured to:
   recognize an overspeed monitoring location in front of the vehicle based on a vehicle location or the overspeed monitoring location received from a navigation device;
   set the overspeed monitoring location in front of the vehicle as a target location;
   determine whether the vehicle is coasting according to a position of an accelerator pedal measured by an accelerator position sensor; and
   determine to start target location-based shift control when the vehicle is coasting toward the target location.

3. The system of claim 2, wherein the shift controller is configured to:
   compare the SOC value of the battery with a reference SOC value of the battery;
   compare the regenerative braking amount with a maximum regenerative braking amount when the shift controller concludes that the SOC value of the battery is less than the reference SOC value of the battery; and
   change a current stage of the shifting stage to a lower stage when the shift controller concludes that the regenerative braking amount is equal to or greater than the maximum regenerative braking amount.

4. The system of claim 3, wherein the maximum regenerative braking amount is set according to a motor capacity and a battery capacity.

5. The system of claim 3, wherein the shift controller is configured to determine a motor regenerative torque according to the changed shifting stage after the shifting stage is changed.

6. The system of claim 2, wherein the shift controller is configured to:
   compare the SOC value of the battery with a reference SOC value of the battery;
   compare the regenerative braking amount with a maximum regenerative braking amount when the shift controller concludes that the SOC value of the battery is less than the reference SOC value of the battery; and
   increase a motor regeneration amount by a predetermined regeneration amount when the shift controller concludes that the regenerative braking amount is less than the maximum regenerative braking amount.

7. The system of claim 6, wherein the predetermined regeneration amount is adjusted according to a distance between the vehicle location and the target location and the vehicle speed.

8. The system of claim 3, wherein the shift controller is configured to perform the shift control using an engine brake when the SOC value of the battery is equal to or greater than the reference SOC value of the battery.

9. A method for controlling shifting stage of a vehicle, the method comprising:
   determining, by a shift controller, a start of shift control of the vehicle according to a travel environment and a travel state of the vehicle;
   comparing, by the shift controller, a vehicle speed of the vehicle with a target vehicle speed when the start of the shift control is determined; and
   performing, by the shift controller, the shift control according to a state of charge (SOC) value of a battery of the vehicle and a regenerative braking amount of the vehicle when the shift controller concludes that the vehicle speed exceeds the target vehicle speed.

10. The method of claim 9, wherein the determining to start the shift control includes:
    recognizing an overspeed monitoring location in front of the vehicle based on a vehicle location or the overspeed monitoring location received from a navigation device;
    setting the overspeed monitoring location in front of the vehicle as a target location;
    determining whether the vehicle is coasting according to a position of an accelerator pedal measured by an accelerator position sensor; and
    determining to start target location-based shift control when the vehicle is coasting toward the target location.

11. The method of claim 10, wherein the performing of the shift control includes:
    comparing the SOC value of the battery with a reference SOC value of the battery;
    comparing the regenerative braking amount with a maximum regenerative braking amount when the shift controller concludes that the SOC value of the battery is less than the reference SOC value of the battery; and
    changing a current stage of the shifting stage to a lower stage when the shift controller concludes that the regenerative braking amount is equal to or greater than the maximum regenerative braking amount.

12. The method of claim 11, wherein the maximum regenerative braking amount is set according to a motor capacity and a battery capacity.

13. The method of claim 11, wherein the performing of the shift control further includes:
    determining a motor regenerative torque according to the changed shifting stage after the shifting stage is changed.

14. The method of claim 10, wherein the performing of the shift control further includes:
    comparing the SOC value of the battery with a reference SOC value of the battery;
    comparing the regenerative braking amount with a maximum regenerative braking amount when the shift controller concludes that the SOC value of the battery is less than the reference SOC value of the battery; and increasing a motor regeneration amount by a predetermined regeneration amount when the shift controller concludes that the regenerative braking amount is less than the maximum regenerative braking amount.

15. The method of claim 14, wherein the predetermined regeneration amount is adjusted according to a distance between the vehicle location and the target location and the vehicle speed.

16. The method of claim 11, wherein the performing of the shift control further includes:

performing the shift control using an engine brake when the SOC value of the battery is equal to or greater than the reference SOC value of the battery.

17. A non-transitory computer readable storage medium on which a program for performing the method of claim 9 is recorded.

* * * * *